(12) United States Patent
Vaillancourt

(10) Patent No.: US 11,193,721 B2
(45) Date of Patent: Dec. 7, 2021

(54) HEAT RECOVERY UNIT FOR GRAY WATER

(71) Applicant: Mario Vaillancourt, Sherbrooke (CA)

(72) Inventor: Mario Vaillancourt, Sherbrooke (CA)

(73) Assignee: Mario Vaillancourt, Sherbrooke (CA)

(*) Notice: Subject to any disclaimer, the term of this patent is extended or adjusted under 35 U.S.C. 154(b) by 0 days.

(21) Appl. No.: 16/984,868

(22) Filed: Aug. 4, 2020

(65) Prior Publication Data

US 2020/0363140 A1 Nov. 19, 2020

Related U.S. Application Data

(63) Continuation-in-part of application No. 16/481,126, filed as application No. PCT/CA2019/050023 on Jan. 8, 2019, now Pat. No. 10,775,113.

(30) Foreign Application Priority Data

Jan. 8, 2018 (CA) ..................................... 2911210

(51) Int. Cl.
*F28D 21/00* (2006.01)
*E03B 1/04* (2006.01)
(Continued)

(52) U.S. Cl.
CPC .......... *F28D 21/0012* (2013.01); *E03B 1/041* (2013.01); *E03C 1/044* (2013.01);
(Continued)

(58) Field of Classification Search
CPC ...... F28D 21/0012; F28D 7/106; E03C 1/044; E03C 2001/005; F24D 2200/20
(Continued)

(56) References Cited

U.S. PATENT DOCUMENTS 4,531,572 A * 7/1985 Molitor ............... F24D 17/0057
165/47
2011/0155366 A1 6/2011 Brunn
(Continued)

FOREIGN PATENT DOCUMENTS

CA 2903527 3/2016

OTHER PUBLICATIONS

International Search Report dated Mar. 13, 2019, International application No. PCT/CA2019/050023.

*Primary Examiner* — Tuan N Nguyen
(74) *Attorney, Agent, or Firm* — Brouillette Legal Inc.; Robert Brouillette

(57) ABSTRACT

The invention relates to a heat recovery unit to transfer heat from a gray water source discharged from a bath or a shower to preheat fresh cold water supplying a bath, a shower, a boiler system or hot water heater. The heat recovery unit comprises an inner tube, an outer tube, a non-return valve, an anode, deflectors as well as associated piping and fittings. Fresh water from a pressurized public network or well flows through the inner tube while the gray water flows between the inner and outer tubes. The non-return valve installed in the fresh water pipe prevents contamination of the drinking water system. A translucent pipe may be installed in a section of the gray water piping system to detect any leaks. An insulated jacket may be placed around the unit to reduce heat loss. The heat recovery unit may be used in domestic, commercial, industrial and institutional buildings.

9 Claims, 6 Drawing Sheets

(51) Int. Cl.
  *E03C 1/044* (2006.01)
  *F28D 7/10* (2006.01)
  *E03C 1/12* (2006.01)
  *E03C 1/00* (2006.01)

(52) U.S. Cl.
  CPC ............... *E03C 1/12* (2013.01); *F28D 7/106* (2013.01); *E03B 2001/045* (2013.01); *E03C 2001/005* (2013.01); *E03C 2001/1206* (2013.01); *F24D 2200/20* (2013.01)

(58) Field of Classification Search
  USPC .............................................. 165/109.1, 287
  See application file for complete search history.

(56) References Cited

U.S. PATENT DOCUMENTS

| | | |
|---|---|---|
| 2014/0053332 A1 | 2/2014 | Cole |
| 2014/0190644 A1* | 7/2014 | Townsend ............ D21H 21/146 |
| | | 162/111 |
| 2017/0167804 A1 | 6/2017 | Mackelvie |

* cited by examiner

HEAT RECOVERY UNIT FOR GRAY WATER

CROSS-REFERENCE TO RELATED APPLICATIONS

The present patent application is a continuation-in-part application of related American Patent Application no. U.S. Ser. No. 16/481,126, entitled "Heat Recovery Unit for Gray Water", filed on Jul. 26, 2019, which is a national phase entry of International Patent Application no. PCT/CA2019/050023, entitled "Heat Recovery Unit for Gray Water", filed on Jan. 8, 2019, which claims the priority of Canadian Patent Application CA 2,991,210, entitled "Heat Recovery Unit for Gray Water Equipped with a Protection Method and Device Preventing Contamination of Fresh Water" filed with the Canadian Intellectual Property Office on Jan. 8, 2018.

FIELD OF THE INVENTION

The present invention generally relates to the field of water heating and thermal energy recovery from gray water.

BACKGROUND OF THE INVENTION

In conventional plumbing installations, where no heat recovery unit is present, used hot gray water originating from a shower or a bath flows to the drainage system and the thermal energy still present in the gray water is lost. Although gray water heat recovery models are available on the market, they are usually installed vertically and are only located on the main drain of the building. This location greatly limits heat recovery from gray water due to the fact that the heat accumulated in the apparatus is quickly lost by the sudden arrival of several liters of very cold water coming from toilets, sinks and other hardware.

Canadian Patent Application CA 2,903,527 (Gil et al.) discloses a counter-current gray water heat recovery apparatus for pre-heating fresh water by passing it through coil or linear tubing modules immersed in a gray water sump. The heat exchanger has a first side defining a gray water flow path, and a second side defining a fresh-water flow path. The gray water path is a gravity-feed flow path, while the fresh water flow path is a pressure-feed flow path. The use of coils or linear tubing modules can be inconvenient and result in significant maintenance issues, as the coils or linear tubing modules need to be cleaned or replaced. In addition, the use of this system in domestic settings may be limited by the costs involved in setting it up and operating it.

French Patent Application FR 2,970,071 (Duong) discloses an apparatus for recovering heat from gray water comprising a cylindrical conical container filled with gray water surrounded by fresh water. In this arrangement, since the fresh water pressure is higher than the gray water pressure inside the container, the cylindrical portion must be strong enough to withstand the external pressure from the fresh water. This can significantly impact the operating costs of this type of system.

German Patent Application DE 10201501477 (Molle et al.) discloses a gray water heat recovery apparatus whereby a gray water tank is surrounded by a fresh water conduit before it is heated prior to consumption. In this case, thermal energy recovery is limited by the relatively large size of the gray water container.

There is thus a need for a simple and efficient gray water heat recovery system that can help reduce energy costs in domestic as well as public buildings.

OBJECTS OF THE INVENTION

An object of the present invention is to recover energy from gray water sources while simultaneously heating up fresh water to reduce energy requirements from public network sources for domestic, public and industrial use.

Further objects and advantages of the present invention will be obvious to one skilled in the art upon an understanding of the illustrative embodiments described below.

SUMMARY OF THE INVENTION

The objectives of the present invention are realized by generally providing a system for recovering heat from gray water while protecting the fresh water source from contamination.

The function of the heat recovery unit of the present invention is to transfer the heat from a hot gray water source to a cold fresh water source that supplies fresh water to baths, showers or a water heater.

In one embodiment of the present invention, the heat recovery unit is integrated into the plumbing system of a building. Preheating the cold water in the shower or a bath significantly reduces the amount of energy required to heat the cold water to be consumed. The heat recovery unit device results in energy and cost savings. The use of a heat recovery unit may also increase the ability to heat up a larger volume of water when the capacity of the existing system is limited. The present invention is suitable for installation in domestic, commercial, industrial and institutional buildings.

In one embodiment of the present invention, the drinking water system is protected by a simple method and a reliable device which is based on the following principle: in the event of a leak in the heat exchanger, it is impossible to contaminate the drinking water of the network as long as the network is pressurized. Contaminated water cannot travel from a low-pressure to a high-pressure network. Contamination becomes possible only if the hydrostatic pressure of the drinking water system becomes equal to or less than the hydrostatic pressure in the heat recovery unit. In this event, the non-return valve, also known as a check-valve, installed on the drinking water inlet conduit prevents any possibility of contamination of the drinking water network through siphoning or backflow of the gray water.

The gray water return pipe exiting the heat recovery unit of the invention is optionally provided with a transparent section that makes it possible to detect fresh water leakage into the gray water system when a bath or shower is not in use. If the flow of water in the transparent pipe is observed when no gray water flow is entering the heat recovery unit, this will indicate that there is a possible puncture or breakage in the cylinder separating the fresh water and the gray water, suggesting that maintenance may be needed to prevent contamination of the hot water being provided to the shower or bath. This can occur following pressure fluctuations in the fresh water network. When a leak is detected, the presence of the non-return valve in the fresh water inlet conduit prevents contamination of the public fresh water network system. In this case, while the leak may affect the heat recovery unit, it will not contaminate the fresh water system.

Advantageously, the heat recovery unit of the present invention is simple and easy to assemble using standard equipment available from a hardware store or plumbing supplier. Generally, the thermal energy recovery unit comprises two concentric tubes allowing for two reservoirs, the first internal to the inner tube and the second between the two concentric tubes. The concentric tubes may be round or have any other suitable geometrical shape. The walls of the tubes may be smooth or corrugated, and when assembled in the heat recovery unit, the tubes are closed at both ends. The two concentric tubes may further be welded together to form a single piece of equipment held together without a seal or any other material that may be prone to leaking.

In use, fresh water is directed to the inner tube, whereas the gray water flows in the space between the two tubes. Due to the fact that fresh water from the public network is pressurized, the water pressure within the inner tube is higher than the pressure between the two tubes. This enables the use of an inner tube having a thin wall to promote the heat exchange between both fluids while preventing the collapse of the inner tube. A higher pressure on the outer side of the inner tube would require a much thicker inner tube wall to account for pressure instability, and this thicker inner tube would reduce the efficiency of the heat transfer.

In another embodiment of the present invention, the unpressurized gray water enters the heat recovery unit at the top at one end and passes all around the tube that contains the pressurized fresh water, and comes out at the bottom at the other end. The fresh water is then heated by the hot gray water that passes around the inner tank or tube. The inner tank of pressurized fresh water offers a large heat recovery surface while the external reservoir of gray water offers no restriction or grip to foreign bodies that may be present in the gray water. The circulation of the gray water is free and is enabled by the static pressure resulting from the gray water level difference, between the inlet and the outlet of the heat recovery unit according to the principle of interconnected vessels.

In an embodiment of the present invention, the fresh water tank or inner tube is optionally equipped with an anode.

In another embodiment of the present invention, deflectors are used to redirect substances entering from the input nozzles at angled directions relative to their initial direction.

The heat recovery unit may be small but still efficient and safe. The heat recovery unit may be manufactured using simple manufacturing methods with the use of high-quality standard materials and components used in plumbing. This feature makes it easier to comply with building standards, whether for an existing building installation or a new construction.

The performance of the invention is proportional to the quantity and the temperature of the water used. The heat recovery unit may preheat fresh cold water before it is used or be linked to a boiler system or hot water heater.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel heat recovery unit for gray water will be described hereinafter. Although the invention is described in terms of specific illustrative embodiment(s), it is to be understood that the embodiment(s) described herein are by way of example only and that the scope of the invention is not intended to be limited thereby.

In the application, reference to "clean" or "fresh" water includes potable water that is suitable for drinking. "Gray" water refers to all wastewater generated in households or office buildings from streams except for the wastewater from toilets. Sources of graywater include, sinks, showers, baths, clothes washing machines and dish washers.

In an embodiment of the present invention, the heat recovery unit comprises:
a. an inner tube;
b. an outer tube having a larger diameter than the inner tube, the outer tube externally enclosing the inner tube in a concentric manner so as to create a conduit between the inner tube and the outer tube;
c. a first end-piece adapted to seal both a first end of the inner tube and a first end of the outer tube, wherein the first-end piece comprises two nozzles (30/42), one for the inner tube and one for the outer tube; and
d. a second end-piece adapted to seal both a second end of the inner tube and a second end of the outer tube, wherein the second end-piece comprises two nozzles (32/40), one for the inner tube and one for the outer tube.

Figure 1:
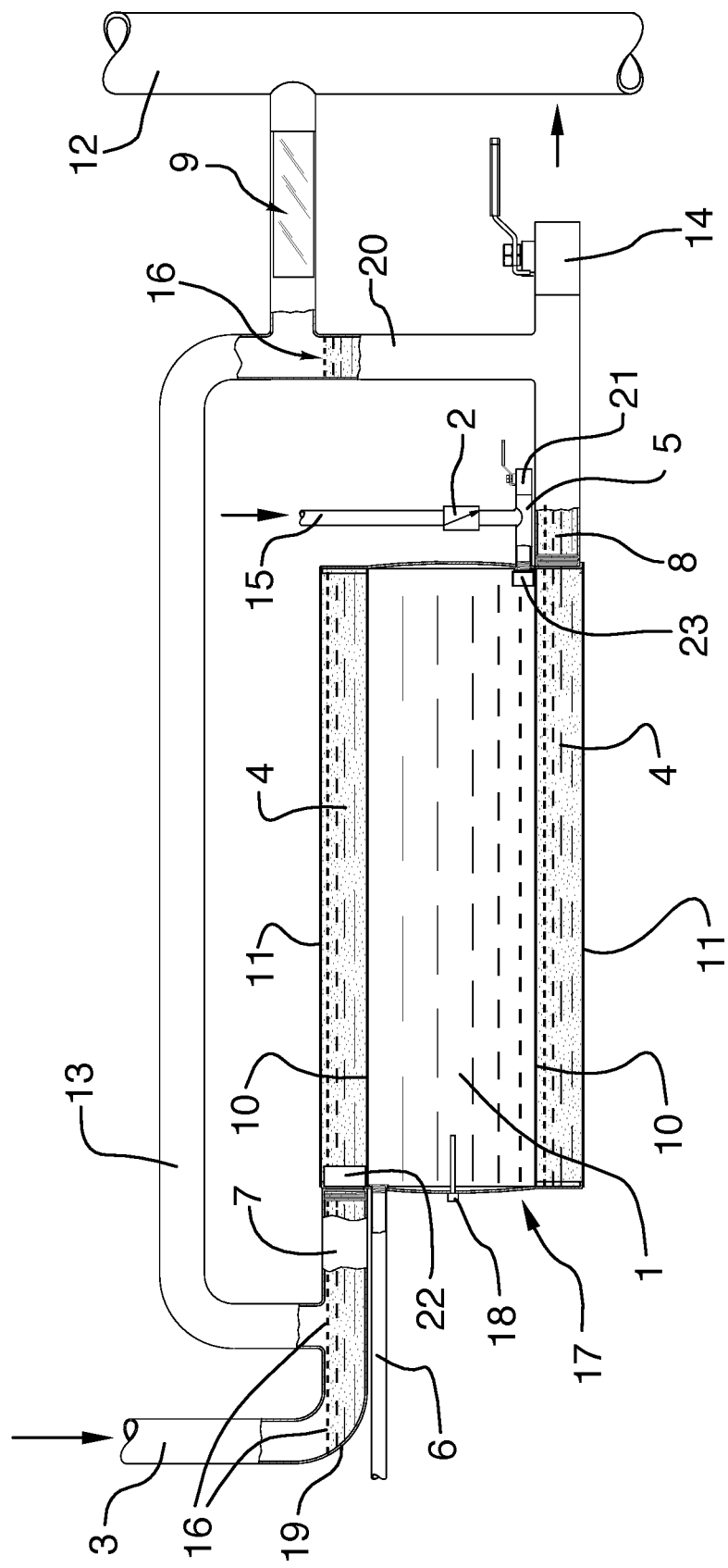
FIG. 1 is a schematic illustration of a horizontal heat recovery unit and associated plumbing in accordance with the invention.
Figure 2:
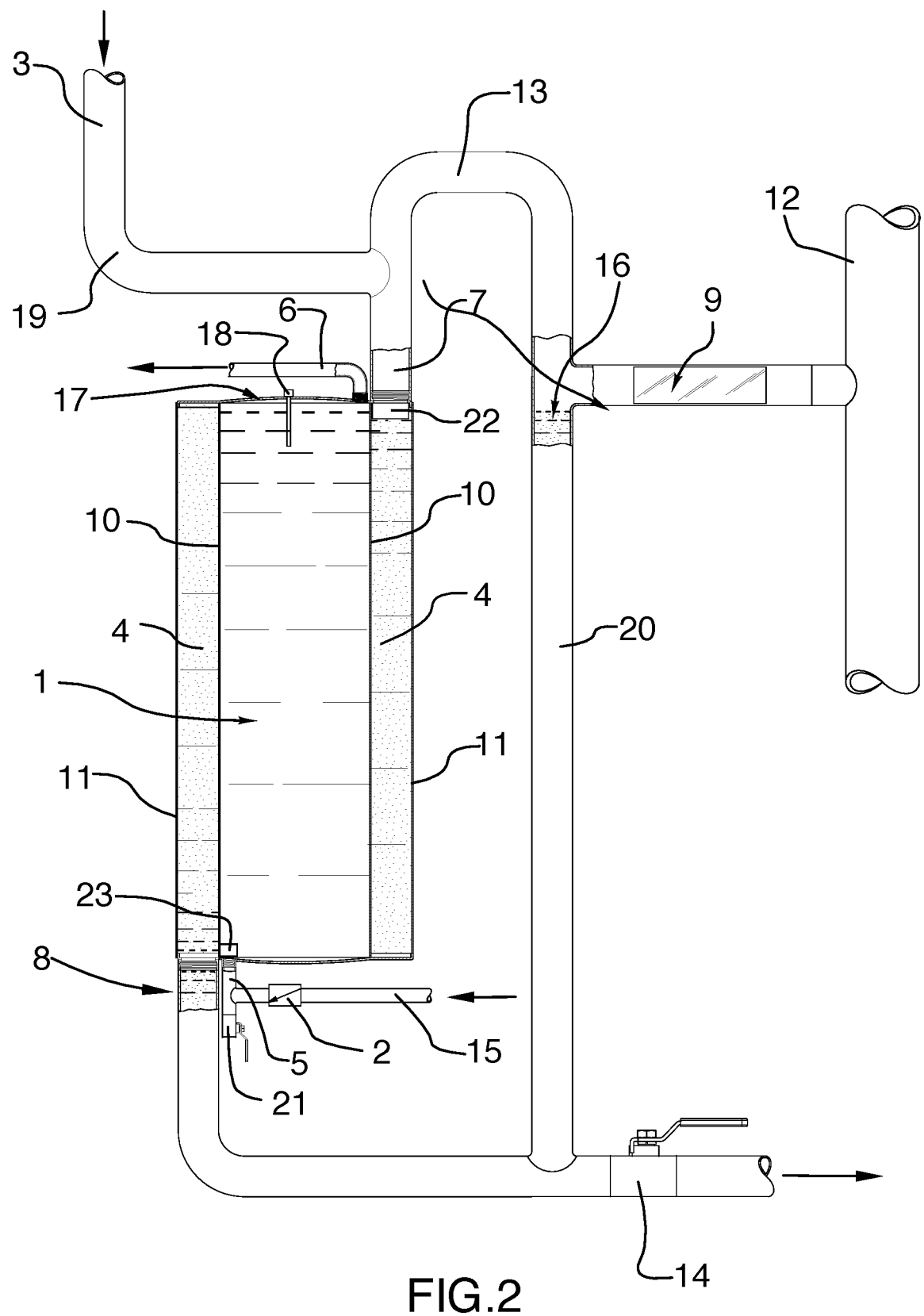
FIG. 2 is a schematic illustration of a vertical heat recovery unit and associated plumbing in accordance with the invention.

In one embodiment of the present invention, the heat recovery unit (11) may be installed horizontally as shown in FIG. 1, or vertically as shown in FIG. 2. This unique concept has two sections, the hot water section and the cold water section. In both installations, the hot water section is located between the top and the center of the unit, while the cold water section is located between the center and the bottom of the unit.

In another embodiment of the present invention, as described in FIG. 2, the gray water inlet conduit or collector (7) is located at the top of the heat recovery unit and is of the same diameter as the gray water pipe which is connected to the bath/shower (3) or any other commercial, industrial, institutional and naval gray water systems. This concept allows the free flow of gray water inside the outer tube (4) of the heat recovery unit around the inner tube (1) where the fresh water flows. The warm or hot gray water is lighter and is located in the upper part of said heat recovery unit. The hot gray water is cooled by convection within the internal space (4) of the outer tube (11) around the inner tube (10) as it goes down into the cold zone at the bottom of the heat recovery unit and exits the unit through the gray water outlet opening (8) and rises by gravity in the gray water pipe (20) until it reaches the top level of the heat recovery unit (16).

In another embodiment of the present invention, the gray water in the gray water outlet pipe (20) must rise to reach the same level as the upper level of the outer tube or tank (4) comprising the gray water to keep the tank full to maximize the heat transfer.

In another embodiment of the present invention, the fresh cold water is supplied from a public aqueduct (15) and passes through the non-return valve (2) before entering the base of the heat recovery unit into the fresh water tank or inner tube (1) through a fresh water inlet opening (5) into the cold water section where it is heated as it flows through the inner tube until it exits the top of the inner tube (1). The hot fresh water being lighter than the cold fresh water rises in the hot zone and comes out at the top of the heat recovery unit (1) and exits through the fresh water outlet (6) to supply the cold tap of the bath/shower or the heater. This has the effect of significantly reducing the hot water consumption of the bath/shower, boiler system or hot water heater by increasing the temperature of the cold fresh water supply.

In another embodiment of the present invention, the heat recovery unit (11) further comprises water deflectors (22, 23). The deflectors (22, 23) are located inside the unit (11), right after the input nozzles (30) and (40) respectively. Deflectors (22, 23) may have varying shapes and sizes, but are to generally have a curved or angled side piece as to redirect the flow of liquid sideways once it enters the unit (11). In some embodiments, deflectors (22, 23) may also have a bottom and/or top piece to restrict the vertical direction of the flow of water. The deflectors (22, 23) are further designed with respect to the nozzles (30, 40) dimensions in mind, thus the gray water deflector (22) may be dimensioned with respect to the dimensions of the gray water inlet nozzle (30) and the fresh water deflector (23) may be dimensioned with respect to the dimensions of the fresh water inlet nozzle (40).

Being located at the water entry points of the inner and outer tank or tubes (4, 1), the deflectors (22, 23) redirect the incoming flow of water sideways as to create and maintain a rotational flow inside each respective tank or tube (4, 1). Water particles entering the tank or tube (4, 1) may thus be directed to follow a rotational pathway along said tank or tube (4, 1) until it reaches the exit at an outlet nozzle (32, 42). By creating such rotational water flows, water particles that have just entered the unit (11) may be less likely to mix and get in contact with other water particles who have been in the unit (11) for a longer period of time. As a result, having deflectors (22, 23) may promote water flowing in a laminar fashion from input to output, thus increasing the efficiency of the unit (11), instead of having turbulent mixes of new and old water in said unit (11).

In another embodiment of the present invention, the heat recovery unit (11) further comprises four (4) master parts developed to work together: 1) a gray water tank or outer tube (4), 2) a fresh water tank or inner tube (1), 3) a non-return valve (2), and 4) a translucent pipe (9) at the gray outlet pipe opening (8).

In another embodiment of the present invention, the pipe coming from the bath/shower (3) feeds the outer gray water tank or tube (4), while the fresh water from the public network pipe (15) feeds the fresh water tank (1) through the fresh water inlet opening (5). The preheated fresh water exits the fresh water inner tube (1) through the fresh water outlet (6) to the cold tap of the bath/shower or the water heater. The gray water flows from the outer tube outlet (8) from the gray water tank (4) to the main drain (12). The pressurized fresh water reservoir wall (10) separates the fresh water from the gray water, while the gray water outer tube wall separates the gray water from the outside of the heat recovery unit. The main drain (12) directs the gray water exiting the gray water tank to a sewage system or a septic tank, or even any gray water collection system for another use prior to being directed to the sewage system or the septic tank.

In another embodiment of the present invention, a vent duct (13) is installed between a pipe (19) feeding the gray water inlet (7) into the outer tube (4) and the gray water outlet pipe (20) at the junction where the translucent pipe (9) is located.

In another embodiment of the present invention, the heat recovery unit may further comprise a gray water drain valve (14) to drain the gray water tank and/or a preheated fresh water drain valve (21) to drain the fresh water inner tube (1).

The heat recovery unit inner tube (1) may further comprise an anode (18), the anode being further attached to a first and a second end inside the inner tube. The anode serves to limit the accumulation of limestone and other mineral deposits in the heat recovery unit inner tube (1) in addition to protecting the steel pipe against corrosion.

In another embodiment of the present invention, the fresh water pipe (15) is fed from a public fresh water pressurized network and enters the heat recovery unit through the fresh water inlet pipe (5) and exits the unit through the fresh water outlet pipe (6) after being preheated.

In another embodiment of the present invention, the gray water pipe (19) is fed from the gray water pipe originating from the used shower or bath (3) and enters the outer tube or gray water tank through the gray water inlet pipe (7). The gray water then exits the said tank through the gray water outlet pipe (8) and is directed to the main drain (12) via gray water intermediate collecting pipe (20) and the translucent pipe (9).

In another embodiment of the present invention, both end-pieces (17) of the heat recovery unit may further have rounded (or convex) surfaces. The round (or convex) shape facing the exterior is to avoid a deformation during the hydraulic pressure test for the inner tube that will hold the pressurized fresh water. The heat recovery unit further comprises nozzles at both end-pieces (17) which are made before assembling the heat recovery unit. The unit may further comprise connecting pipes that may be welded to the first and second end-pieces.

In another embodiment of the present invention, the gray water return pipe exiting the heat recovery unit of the invention is provided with a transparent section (9) which makes it possible to detect fresh water leakage into the gray water system when a bath or shower is not in use. If gray water is present or liquid is flowing in the transparent section (9), this will indicate that there is a possible puncture or breakage in the inner cylinder suggesting that fresh water is leaking from the inner tube into the gray water space. As the heat recovery unit is kept full at all times, any additional water will flow through the gray water system and pass through the transparent section (9) before exiting the main drain (12). If a leak is detected, the unit may be removed from operation for repair to prevent contamination of the fresh water feeding the heat recovery unit in case pressure fluctuations in the fresh water network occur. When a leak is detected, the presence of the non-return valve in the fresh water inlet conduit prevents contamination of the public fresh water network system. In this case, while the leak may affect the heat recovery unit, it will not contaminate the fresh water system.

In another embodiment of the present invention, an insulating jacket may be installed around the heat recovery unit. The insulating jacket may comprise three sections, one for each end and one for the cylindrical section of the heat recovery unit. The insulating jacket may be made of a flexible material or a rigid material such as urethane.

In another embodiment of the present invention, the heat recovery unit outer tank or tube wall (11) may be of high-quality stainless steel being thick enough to last a long time.

In another embodiment of the present invention, the pressurized inner tank (10) may be made of high-quality stainless steel in order to obtain maximum heat transfer. Both end-pieces of the heat recovery unit inner tube (10) may further comprise a linear section facing the interior ends (17) and may also be made of stainless steel. The gray water inlet (7) and outlet (8) nozzles (30/32) are made of stainless steel, as well as any adapters or fittings that are connected to any plumbing parts. The inner tube may further be adapted to withstand a pressure of at least 225 psi.

In another embodiment of the present invention, the external tube may be adapted to allow the gray water to fill the space between the inner tube and the outer tube at all times. The internal tube may also be adapted to be filled with fresh water at all times.

In another embodiment of the present invention, other types of fluids may be used to feed the heat recovery unit in order to transfer heat from a hot stream to a cold stream. The heat recovery unit may be used not only to recover heat from gray water streams but also to heat or cool down systems that need to be heated or cooled. In another embodiment, water from a well may also be used as a source of cold water to be heated up using the heat recovery unit.

In another embodiment of the present invention, the heat recovery unit may be adapted to integrate a device provided with an application that allows a continuous monitoring of the unit and its operating efficiency. The heat recovery unit may be further adapted to operate in a network of devices or Internet of Things (IoT).

In another embodiment of the present invention, the heat recovery unit may be of any geometrical shape. The heat recovery unit may be of different sizes or may be further elongated or narrower depending on space restrictions. Space changes may impact the heat transfer and consequently the thermal efficiency of the heat recovery unit.

In another embodiment of the present invention, the heat recovery unit may be adapted to comply with local regulations as well as any fittings, piping or any other required plumbing equipment.

Example 1

Figure 3:
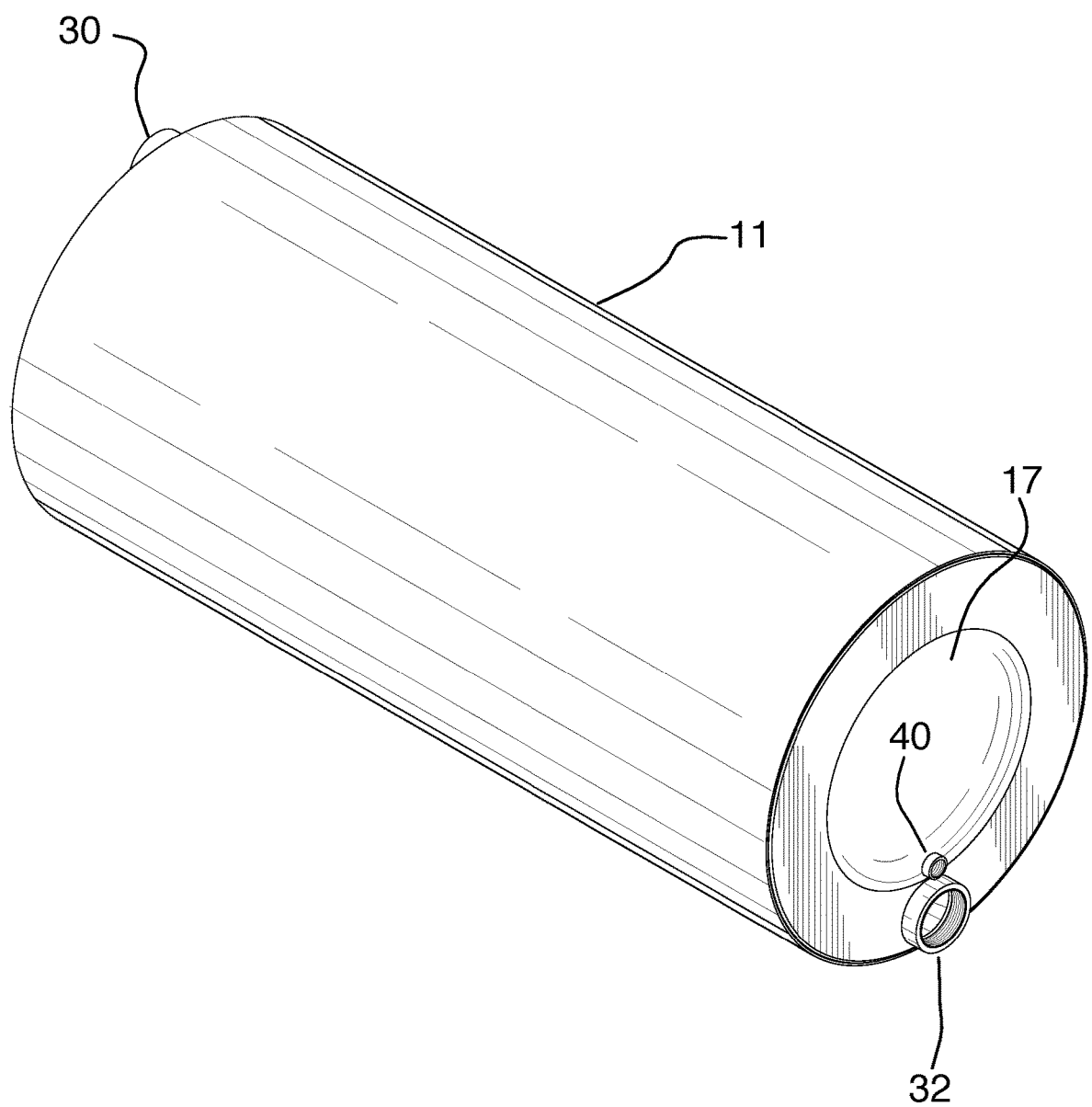
FIG. 3 is an example of a perspective view of the heat recovery unit in accordance with the invention.
Figure 4:
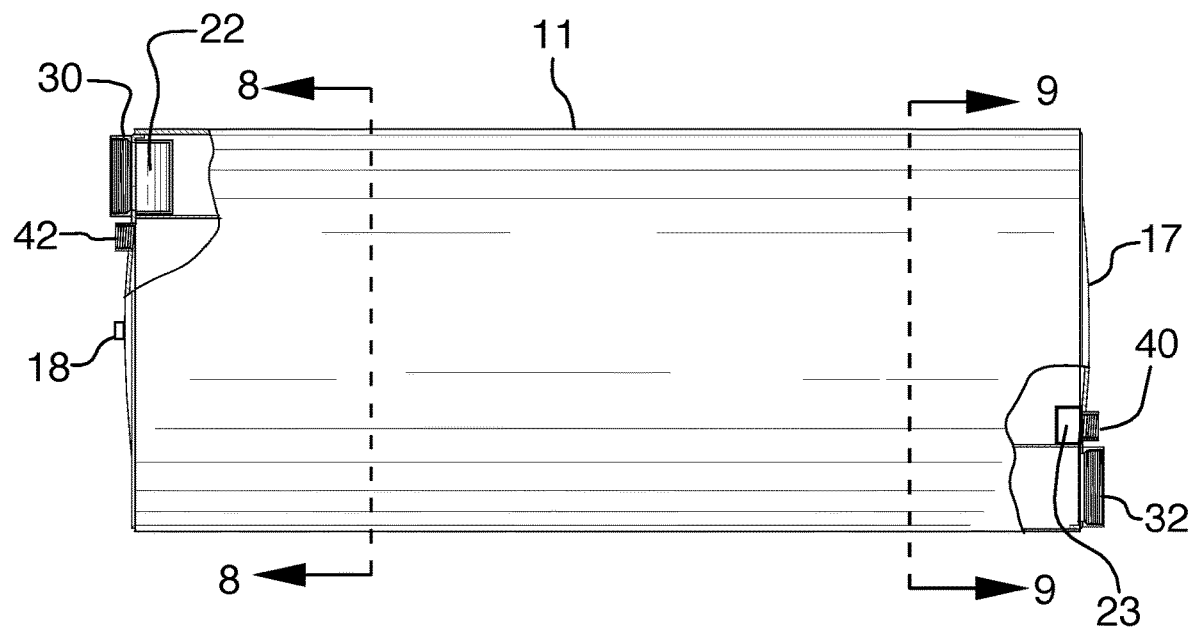
FIG. 4 is an example of a front view of the heat recovery unit in accordance with the invention.
Figure 5:
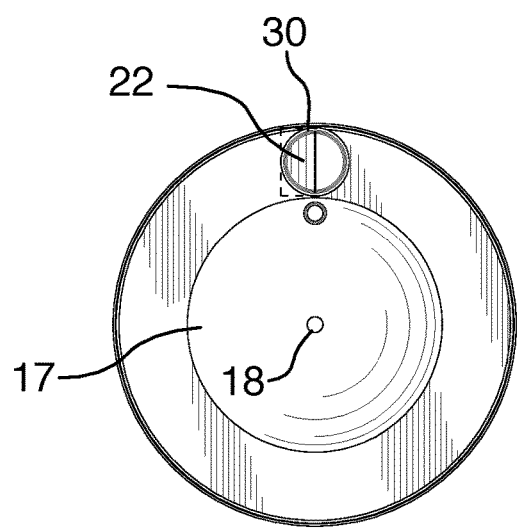
FIG. 5 is an example of a side view of the heat recovery unit in accordance with the invention.
Figure 6:
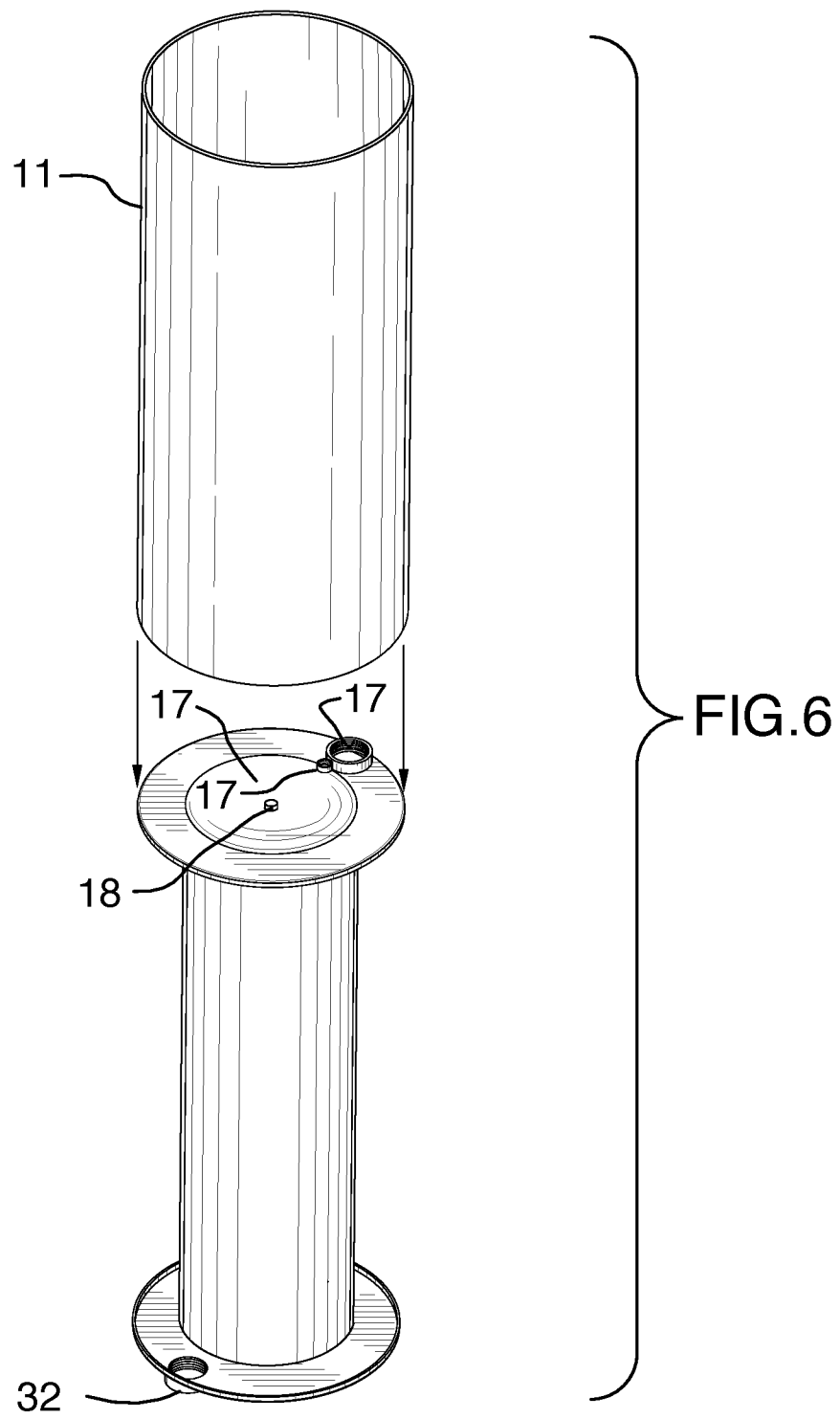
FIG. 6 is an example of an exploded view of the heat recovery unit showing the inner and outer tubes.
Figure 7:
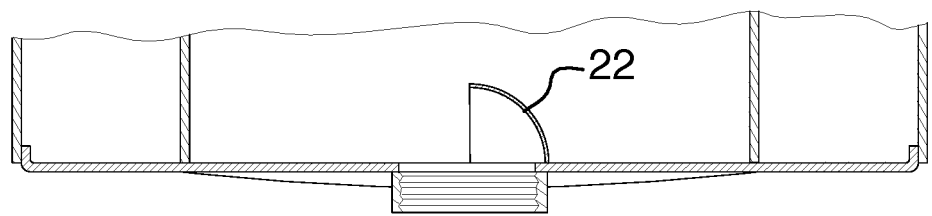
FIG. 7 is an example of a top sectional view of the heat recovery unit showing the gray water deflector.
Figure 8:
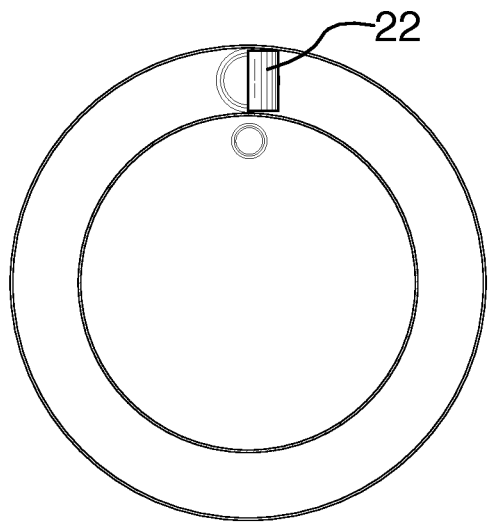
FIG. 8 is a sectional view from FIG. 4 showing inside the heat recovery unit with the gray water deflector.
Figure 9:
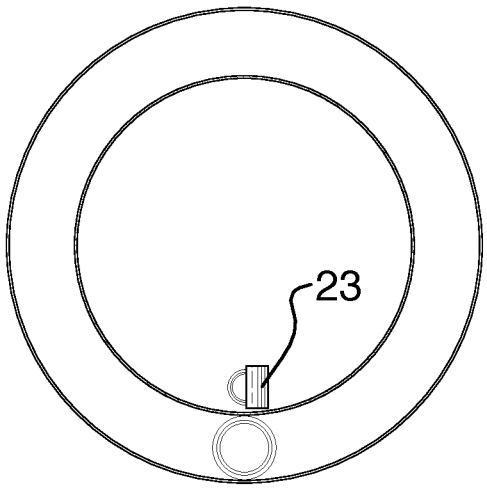
FIG. 9 is a sectional view from FIG. 4 showing inside the heat recovery unit with the fresh water deflector.

An example of the present invention is illustrated in FIGS. 3-5. FIG. 3 shows a perspective view of the heat recovery unit while FIG. 4 shows a front view and FIG. 5 shows a side view. The gray water nozzles (30/32) and fresh water nozzles (40/42) shown in FIGS. 3-5 may be placed inversely on both sides, at the top on one end and at the top on the other end. FIG. 6 illustrates an exploded view of both inner (10) and outer (11) tubes and respective ends. The gray water may be fed to the unit via a gray water inlet nozzle (30) while the fresh water may be fed to the unit on the opposite end via the fresh water inlet nozzle (40). The gray water may then exit the unit via a gray water outlet nozzle (32) whereas the fresh water may then exit the unit via a fresh water outlet nozzle (42).

The heat recovery unit may be 33 inches long with an inner tube diameter of 9 inches and an outer tube diameter of 14 inches. The inner tube thickness may be 1/20 inches (0.05 inches) and an outer tube with a thickness of 5/64 inches (0.078125 inches). The inner tube water inlet and outlet nozzles may have a 3/4 inches (0.75 inches) diameter while the outer tube inlet and outlet nozzles may have a 2 inches diameter. The ends of both inner and outer tubes may have a thickness of 1/8 inches (0.125 inches). The outer tube may hold 42 L of gray water while the inner tube may hold 41 L of fresh water. The weight of the heat recovery unit may be 60 lbs with a weight of water of 184 lbs resulting a total weight of 244 lbs. In this embodiment of the present invention, the fresh water temperature increase is about 15° C. The prototype has been in use for about 3 years.

The features of the present invention which are believed to be novel are set forth with particularity in the appended claims.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. A heat recovery unit comprising:
    a) an inner tank having two ends and at least an outer surface;
    b) an outer tank being larger than the inner tank having two ends and at least an outer surface and an inner surface, the outer tank enclosing the inner tank so as to create a heat conduit between the at least one outer surface of the inner tank and the at least one inner surface of the outer tank;
    c) a first input nozzle at a first end of the inner tank;
    d) a second input nozzle at a first end of the outer tank;
    e) a first output nozzle at the other end of the inner tank;
    f) a second output nozzle at the other end of the outer tank;
    g) a first deflector located inside the inner tank, close to the input nozzle of the inner tank; and
    h) a second deflector located inside the outer tank, close to the input nozzle of the outer tank;
    wherein the first and second deflectors are used to redirect substances entering from the input nozzles at angled directions relative to their initial direction.

2. The heat recovery unit of claim 1, wherein the first and second deflectors each comprise a side piece used to redirect the flow of substances entering from the input nozzles.

3. The heat recovery unit of claim 2, wherein the first and second deflectors further comprise a bottom piece, the bottom piece being in connection with the side piece.

4. The heat recovery unit of claim 3, wherein the first and second deflectors further comprise a top piece, the top piece being in connection with the side piece.

5. The heat recovery unit of claim 2, wherein the side piece has a substantially curved shape.

6. The heat recovery unit of claim 1, wherein the first and second deflectors redirect the entirety of incoming substances from the input nozzles.

7. The heat recovery unit of claim 1, wherein the first and second deflectors are welded to their respective tank.

8. The heat recovery unit of claim 1, wherein the inner and outer tanks have a cylindrical shape.

9. The heat recovery unit of claim 1, wherein: the heat recovery unit is used in a counter-current mode and the substances used are liquids.

* * * * *